United States Patent [19]
Despard et al.

[11] Patent Number: 5,147,545
[45] Date of Patent: Sep. 15, 1992

[54] MATED DISK FILTER HOUSING

[75] Inventors: Peter J. Despard, Hamlin; Donald M. Forster, Penfield; Gregory P. Guyette, Macedon, all of N.Y.

[73] Assignee: Eastman Kodak Company, Rochester, N.Y.

[21] Appl. No.: 510,354

[22] Filed: Apr. 16, 1990

[51] Int. Cl.$^5$ .............................................. B01D 29/05
[52] U.S. Cl. .................... 210/445; 210/450; 210/451; 210/453; 55/503; 55/510
[58] Field of Search ............... 210/331, 346, 445, 451, 210/453, 486, 487, 488, 489, 450; 55/503, 510

[56] References Cited

U.S. PATENT DOCUMENTS

| | | | |
|---|---|---|---|
| 1,595,344 | 8/1926 | Lomax | 210/238 |
| 2,073,991 | 3/1937 | Koser | 210/84 |
| 2,727,634 | 12/1955 | O'Meara | 210/164 |
| 2,808,937 | 10/1957 | O'Meara | 210/445 |
| 2,818,178 | 12/1957 | Smith | 210/445 |
| 3,031,082 | 4/1962 | Smith | 210/232 |
| 3,085,689 | 4/1963 | Hering et al. | 210/232 |
| 3,979,295 | 9/1976 | Markley | 210/445 |
| 4,187,182 | 2/1980 | Rosenberg | 210/445 |
| 4,225,440 | 9/1980 | Pitesky | 210/445 |
| 4,356,791 | 11/1982 | Ward et al. | 210/448 |
| 4,382,808 | 5/1983 | Van Wormer, Jr. | 55/502 |
| 4,614,585 | 9/1986 | Mehra et al. | 210/445 |

Primary Examiner—Robert A. Dawson
Assistant Examiner—W. L. Millard
Attorney, Agent, or Firm—Charles E. Snee, III

[57] ABSTRACT

Disclosed herein is a housing for a disk of filter material. The housing includes two disk-shaped parts. One of the housing parts includes a radially-inwardly facing cylindrical surface for locating a filter disk. The other housing part includes a radially-outwardly facing cylindrical surface. The two cylindrical surfaces telescope together during assembly and serve to locate the housing parts relative to one another in directions parallel to the general plane of a filter disk in the housing. The radially inwardly facing cylindrical surface serves to locate a filter disk during assemble. Radially inwardly of the cylindrical surfaces is resilient means for engaging and squeezing the annular peripheral margin of the filter disk for at least partially preventing material being filtered passing radially outwardly of the filter disk and for totally preventing material bypassing the filter disk. Radially outwardly of the cylindrical surfaces is second resilient means providing a seal between the two housing parts for preventing any leakage out of the filter disk, passing to the exterior of the housing.

20 Claims, 5 Drawing Sheets

MATED DISK FILTER HOUSING

BACKGROUND OF THE INVENTION

1. Field of the Invention

This invention relates to housings for disks of filter material.

2. Description Relative to the Prior Art

U.S. Pat. No. 2,808,937, issued to O'Meara on Oct. 8, 1957, describes a filter housing which includes two dome-shaped housing parts with a resilient O-ring disposed between annular flanges at their mating free edges. Means are provided for forcing the housing parts together, thereby compressing the O-ring. A disk of filter material is disposed with its periphery between the O-ring and the flange of one housing part, before the housing parts are brought together and forced together. Such an arrangement has the disadvantage that material being filtered can escape to the exterior of the housing by passing laterally through the flexible fibrous filter material. If the filter disk is very carelessly installed, there is the possibility that at a portion of its periphery there is a gap between the periphery and the O-ring, allowing material to be filtered passing directly to the output chamber of the housing where it mixes with filtrate.

U.S. Pat. No. 3,085,689, issued to Hering et al on Apr. 16, 1963, describes what may, in some respects, be termed an improvement over the housing described in the O'Meara patent. The Hering housing includes a resilient element which is compressed between first and second housing parts. The resilient element seats on one housing part and has two rings of contact with the other housing part. At the inner ring of contact, the periphery of the filter disk is compressed between the resilient element and the other housing part. It is intended that the filter disk not extend into the other ring of contact. However, if the filter disk is faultily installed, as could occur with even the most conscientious person when working in the dark, as must often occur in the photographic industry, the filter disk could again provide a path for material being filtered, to the exterior of the housing. Again faulty installation could create a path bypassing the filter disk and allowing unfiltered material to mix with filtrate.

Obviously both the escape of material to the exterior of the housing and the presence of material intended to be filtered out, in the filtrate are both very undesirable occurrences. Likewise, if the interior of the filter housing is at sub-ambient pressure, atmosphere could be introduced into the filtrate through the filter disk if it extends past the seal.

It is an object of the present invention to overcome the problems of the prior art and provide a superior filter housing which provides aids to prevent faulty insertion of a filter disk and provides a seal preventing lateral leakage through the filter disk reaching the exterior of the housing.

SUMMARY OF THE INVENTION

A filter housing in accordance with the present invention provides a radially inwardly facing cylindrical surface having a diameter slightly larger than the diameter of a filter disk to be used in the housing. The surface serves to positively locate a filter disk and can be felt in the dark. Radially inwardly of the radially inwardly facing cylindrical surface are annular resilient means which serve to grip and compress the periphery of a filter disk when the housing is in an assembled condition. With the disk located by the cylindrical surface, there is no chance that the disk can be so faultily inserted that a portion of the periphery is not gripped and compressed by the resilient means. Radially outwardly of the cylindrical surface is second annular resilient means which serve to create a seal between the two housing parts. This seal, which cannot possibly be reduced in effectiveness by an improperly located filter disk, serves to retain any leakage laterally through the filter disk, within the housing.

BRIEF DESCRIPTION OF THE DRAWINGS

An embodiment of the invention will now be described, by way of example, with reference to the accompanying drawings, in which.

DETAILED DESCRIPTION OF THE PREFERRED EMBODIMENT

Figure 1:
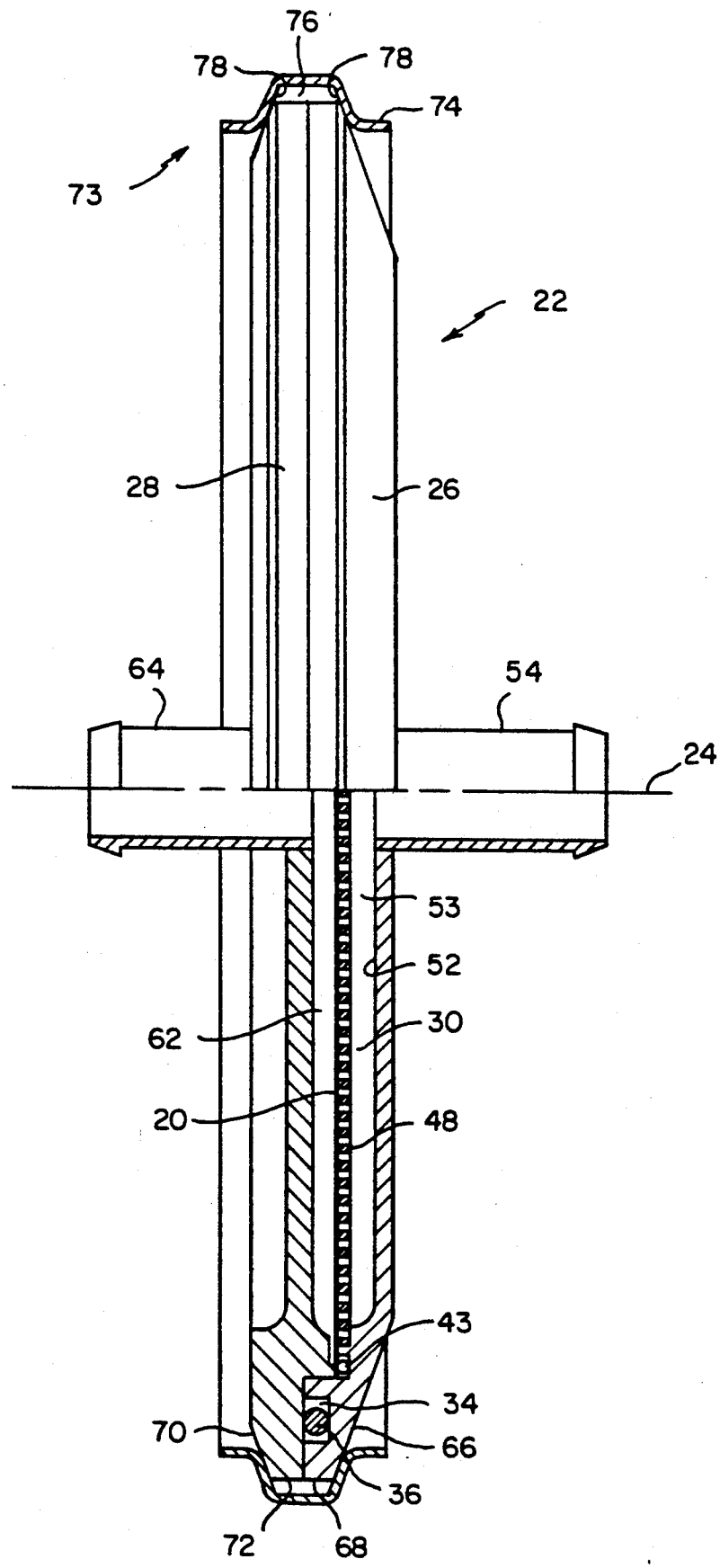
FIG. 1 is a side view, partially in section and with parts omitted for the sake of clarity, of a filter housing in accordance with the present invention.
Figure 5:
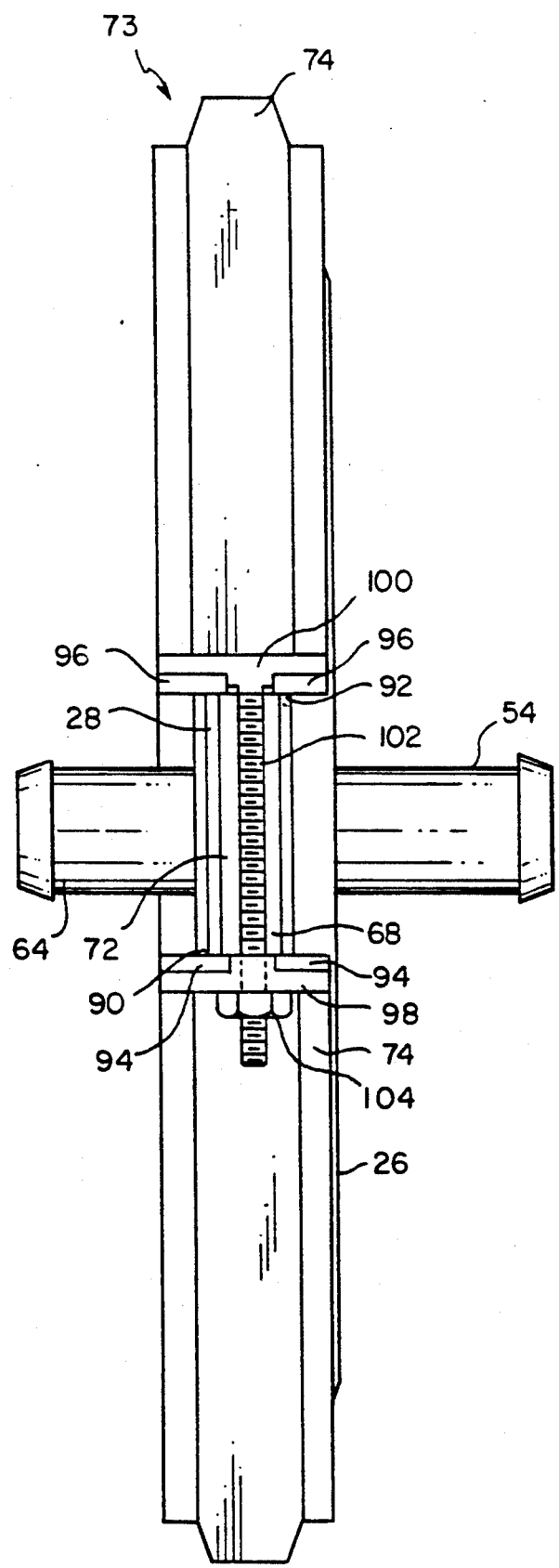
FIG. 5 is a view, similar to that of FIG. 1, but showing means for securing the two housing parts together.

A housing for a disk 20 of filter material is generally indicated by the reference numeral 22 in FIGS. 1 and 5. The housing 22 is disk shaped and has an axis 24 at the center of the disk shape and perpendicular to the plane of the disk shape.

The housing 22 includes a first part 26 (see FIG. 2) and a second part 28 (see FIG. 3), both of which are disk shaped and have the same axis 24 as does the housing 22. The two housing parts 26, 28 together bound a chamber 30, when in the assembled condition illustrated in FIG. 1.

Figure 2:
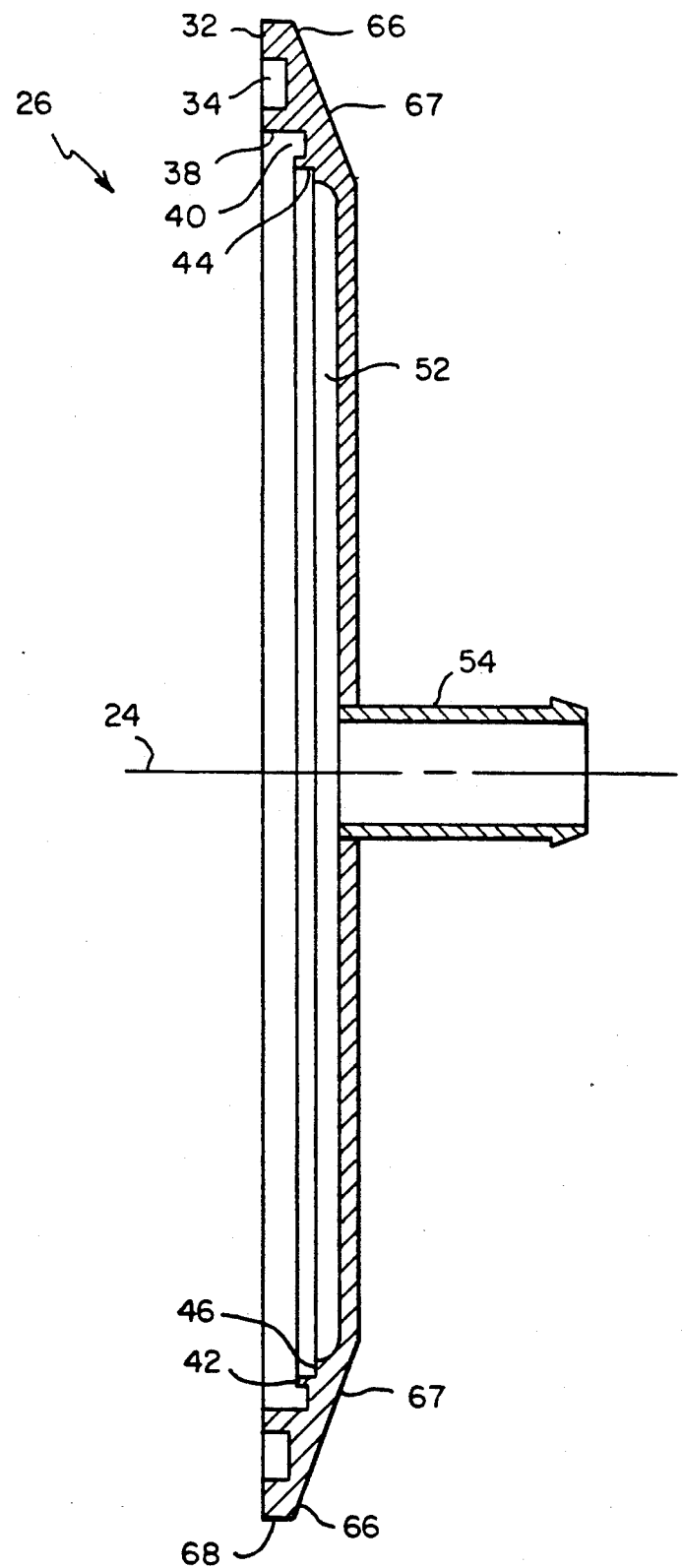
FIG. 2 is a cross-sectional view, taken in the same direction as FIG. 1, of a first housing part of the filter housing illustrated in FIG. 1.

The side of the first housing part 26 which in part bounds the chamber, that is, the side facing to the left in FIG. 2, is dished. The highest part of the dish is disposed at the periphery of the part 26 and is an annular land 32, coaxial with the axis 24 and disposed in a plane normal to the axis 24, that is, parallel to the general plane of a filter disk in the housing. In the land 32 is an annular recess 34, also coaxial with the axis 24. The recess 34 serves as a nest for annular resilient means, which in the present embodiment is in the form of an O-ring 36, which is not shown in FIG. 2 but is shown in FIG. 1.

At the radially inward boundary of the land 32, there is a radially inwardly facing cylindrical surface 38. The surface 38 is coaxial with the axis 24 and has a diameter slightly larger than the diameter of filter disks 20 to be used in the housing 22. A rightwards, as seen in FIG. 2, end portion of the cylindrical surface 38 forms a portion of the boundary of a second annular recess 40 which is also bounded in part, at its radially inner boundary, by a leftwardly, as seen in FIG. 2, extending annular skirt 42. The skirt 42 is coaxial with the axis 24 and does not extend as far to the left, as seen in FIG. 2, as the plane of the land 32. The recess 40 serves as a nest for annular resilient means which, in the present embodiment, is in the form of an O-ring 43, which is not shown in FIG. 2 but is shown in FIG. 1.

Figure 4:
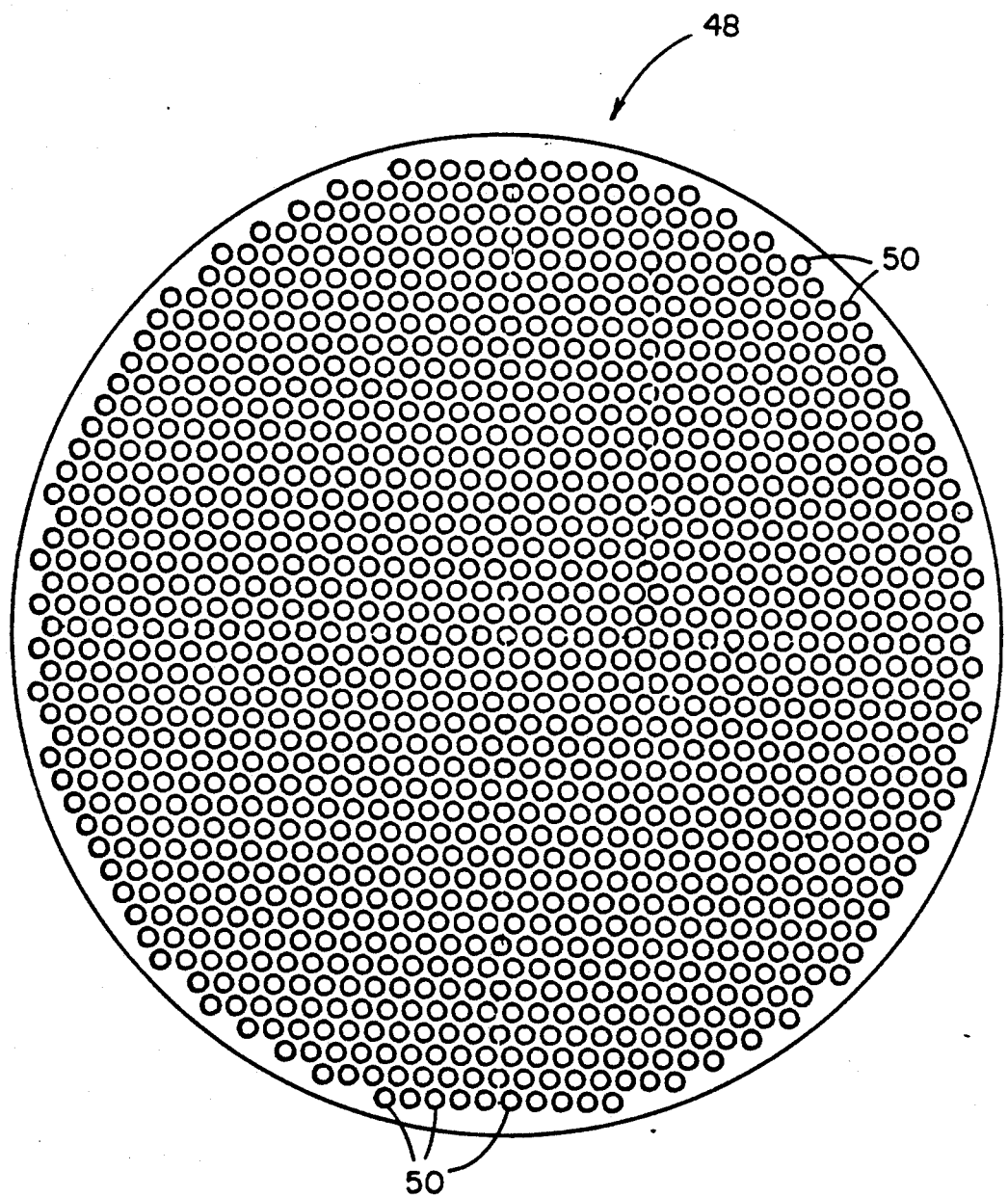
FIG. 4 is a plan view of a filter support disk included in the filter housing illustrated in FIG. 1.

The skirt 42 has a radially inwards facing surface 44 which is cylindrical and coaxial with the axis 24. The surface 44 is bounded at its right hand end, as seen in FIG. 2, that is, at its end further into the dish form of the left surface of the housing part 26, by an annular shoulder 46 disposed in a plane perpendicular to the axis 24. The shoulder 46 and surface 44 serve to seat and locate, respectively, a filter support disk 48 shown in FIGS. 1 and 4.

The filter support disk 48 is formed of material sufficiently strong to inhibit deflection due to pressure on the filter material acting from the input side, the left as seen in FIG. 1, towards the output side, the right as seen in FIG. 1. Deflection is inhibited even when the pressure differential is at a maximum caused by the filter material being plugged. Any distortion of the filter medium, either convexly or concavely, has the potential of altering its filtering characteristics. The support disk 48 has many holes 50 to allow filtrate to pass through.

Deepest into the dished form of the internal surface of the housing part 26 is a recess 52 which extends rightwards, as seen in FIG. 2, from the plane of the shoulder 46, and bounds, with the support disk 48, the outlet chamber 53 of the housing 22. The housing part 22 has an outlet nipple 54 coaxial with the axis 24.

Figure 3:
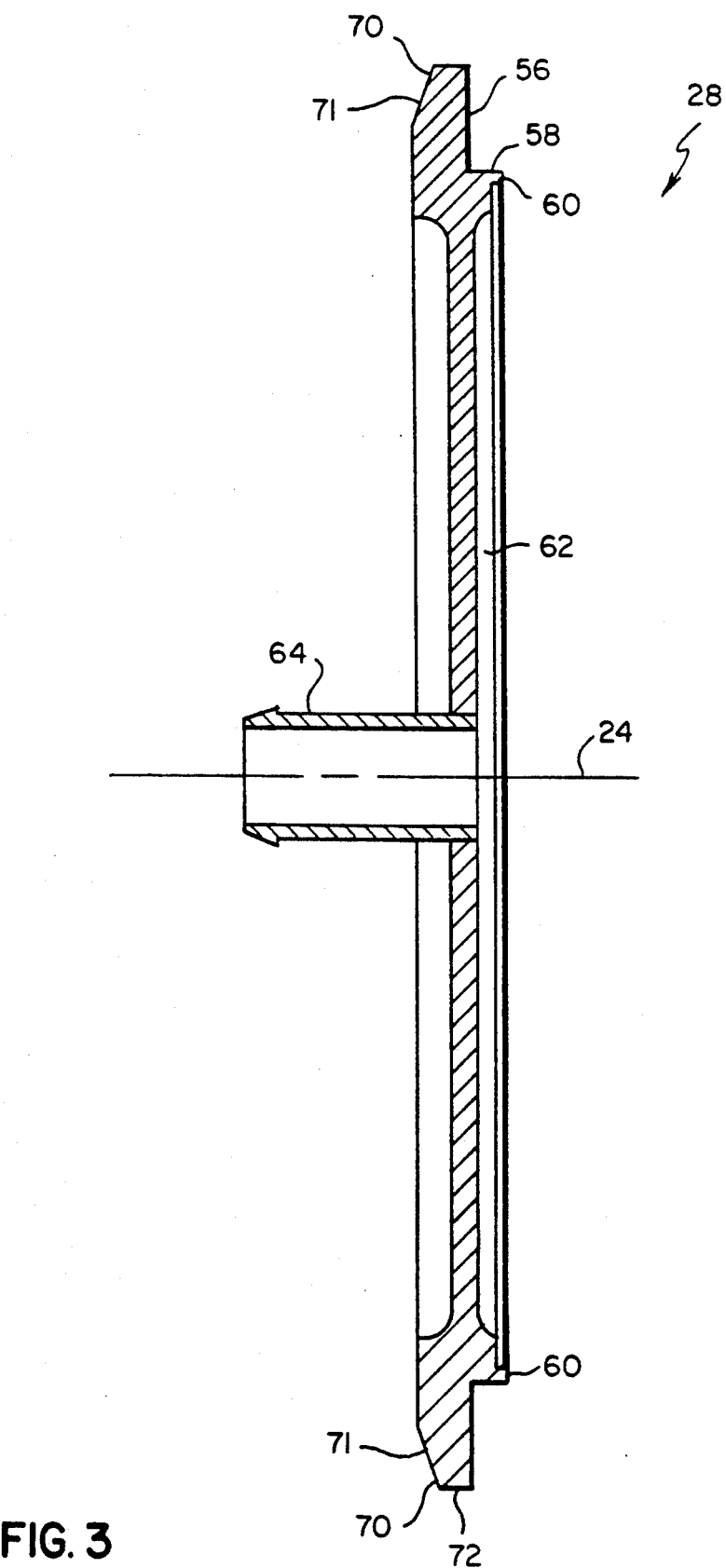
FIG. 3 is a cross-sectional view, similar to FIG. 2, but of a second housing part of the filter housing illustrated in FIG. 1.

The second housing part 28, see FIGS. 1 and 3, has at its periphery, an annular land 56 disposed in a plane perpendicular to the axis 24, that is, parallel to the general plane of a filter disk in the housing. The land 56 confronts the land 32 on the first housing part 26 and is engaged by the O-ring 36 in the assembled condition of the housing. In such condition, the O-ring 36 forms a seal between the two housing parts so that no material escapes from the chamber 30, assuming the chamber is pressurized, and no material can enter the chamber 30, assuming the chamber is at a sub-ambient pressure.

At the radially inner extremity of the land 56, there is a radially outwardly facing cylindrical surface 58 which is coaxial with the axis 24. The radially outwardly facing cylindrical surface 58 of the second housing part 28 and the radially inwardly facing cylindrical surface 38 of the first housing part 26, have such radiuses, respectively, that they telescope over one another during assembly and they serve to accurately locate the housing parts relative to one another in directions perpendicularly of the axis 24.

At the rightwards, as seen in FIG. 3, extremity of the surface 58, there is an annular land 60 disposed in a plane perpendicular to the axis 24, that is in a plane parallel to the general plane of a filter disk in the housing. As may be seen in FIG. 1, in the assembled condition of the housing 22, with a filter disk 20 in the housing, the land 60 serves to trap an annular peripheral margin of the filter 20 against the O-ring 43 and to compress the O-ring 43, whereby the peripheral margin of the filter disk is both trapped and compressed. Even though the peripheral margin of the filter disk is subjected to compressive forces, it may still pass some material being filtered in a radially outwards direction. This may occur by a process which some refer to as wicking. It is for this reason that the seal created by the larger diameter O-ring 36 is also provided. However, even if there is some generally radially directed leakage through the filter material past the O-ring 43, the material is being filtered as it weeps. Thus even if it should then mix with the filtrate, the effect is not as bad as if non-filtered material were to mix with the filtrate. Also, the only path for leakage to a location where it could mix with filtrate, is back through the filter past the O-ring 43. The risk of matter which is supposed to be filtered out, reaching the filtrate is minimal to non-existant.

Radially inwardly of the land 60, the second housing part 28 is dished leftwardly, as seen in FIG. 3, so as to form, with the filter disk 20 supported by its support disk 48, an inlet chamber 62. The depth of chamber 62, as also the depth of chamber 53, may be selected; smaller depth serving to reduce interior volume and greater depth serving to aid flow of high viscosity materials to be filtered.

The second housing part 28 has an inlet nipple 64 providing access for material to be filtered to the inlet chamber 62.

At its exterior, the first housing part 26 has a cylindrical peripheral surface 68; a frusto-conical surface 66, having a half cone angle of 30°, coaxial with the axis 24 and contiguous at its larger diameter with the cylindrical peripheral surface 68; and a frusto-conical surface 67, of 20° half cone angle, coaxial with the axis 24 and contiguous at its larger diameter with the frusto-conical surface 66.

At its exterior, the second housing part 28 has a cylindrical peripheral surface 72; a frusto-conical surface 70, having a half cone angle of 30°, coaxial with the axis 24 and contiguous at its larger diameter with the cylindrical surface 72 at the periphery of the second housing part; and a frusto-conical surface 71, of 20° half cone angle, coaxial with the axis 24 and contiguous at its larger diameter with the frusto-conical surface 70.

The first and second housing parts 26 and 28, respectively, are secured in assembled condition, in which condition both of the O-rings 36 and 43 are compressed, by known securing means 73 illustrated in FIG. 5 and in part in FIG. 1. The securing means 73 includes a hoop 74 having a radially inwardly facing channel 76 with side walls 78 inclined at 20° to the general plane of the hoop. The side walls 78 cooperate initially with the frusto-conical surfaces 66 and 70 and subsequently, upon further tightening, with the surfaces 67 and 71. The hoop 74 is discontinuous, having spaced ends 90, 92. The cooperation of the side walls 78 of the channel 76 in the hoop 74, with the frusto-conical surfaces of the first and second housing parts 26, 28, is such that a tendency to reduce the diameter of the hoop 74 is translated into a tendency to force the housing parts towards one another.

The means for reducing the diameter of the hoop and for retaining the reduced diameter may take the known form of an overcenter toggle device. In such a case the hoop is split into two halves with the toggle device working between one end of each half of the hoop and a T-bolt and nut device working between the other ends of thd hoop halves. A T-bolt and nut arrangement for reducing the diameter of the hoop will now be described.

The hoop 74 has ends 90, 92 which are bifurcated and bent outwardly and backwardly to form claws 94 on the end 90 and claws 96 on the end 92. The claws 94 embrace a rod-shaped reaction member 98. The claws 96 embrace the cross-piece 100 of a T-shaped screw threaded member 102. The member 102 extends through a bore in the reaction member 98 and threadedly cooperates with a nut 104 which reacts against the reaction member 98. The arrangement is such that rotation of the nut 104 in the appropriate sense causes the ends 90, 92 of the hoop 74 to be drawn together thereby causing a reduction in diameter of the hoop 74.

The claws 96 may be extended and folded back onto the remainder of the hoop and secured thereto, as by welding. The cross piece of the T-bolt would thereby be trapped.

It has been found that the provision of 30° half cone angle surfaces 66, 70 radially outside the 20° half cone angle surfaces 67, 71 and the 20° inclination of the walls 78 of the channel 76, has advantages in ensuring uniform engagement of the housing parts with the hoop.

For the sake of understanding the loading of the housing with a filter disk and the assembling of the housing into a condition in which it is useful for filtering, let it be assumed that the two housing parts are separated. Let it also be assumed, as is often the case in the photographic industry, that there is complete darkness. The filter support disk is in its nest formed by the surface 44 and the shoulder 46. A flexible filter disk 20 is brought up to the housing part 26 and is inserted in the space bounded by the radially inwardly facing cylindrical surface 38. The disk 20 is slightly smaller in diameter than the surface 38. It is an easy and foolproof matter to sit the filter disk within the cylindrical surface 38 without any portion of the filter disk extending up onto the land and even, at worst, over the O-ring 36. Should the filter disk be allowed to extend over the O-ring 36 there would be a leakage path through the filter disk to the exterior of the housing, as is the case in many prior art filter housings. However, with the cylindrical surface 38 between the two O-rings 36 and 43, filter disks may be accurately properly located with ease and in a foolproof manner.

With the new filter disk in place, the two housing parts 26 and 28 are brought together with the radially inwardly facing cylindrical surface 38 progressively sliding over the radially outwardly facing cylindrical surface 58. When the O-ring 36 touches the land 56, the hoop 74 is opened up and brought into encircling relationship with the cylindrical surfaces 68 and 72. The hoop is then allowed to assume its natural smaller diameter so that the channel surfaces 78 contact the frusto-conical surfaces 66 and 70 and the hoop clasps the housing parts 26 and 28. The hoop 74 is radially compressed, as by tightening down nut 104, and the housing parts are forced together. The forcing together of the housing parts causes the O-ring 43 to compress, thereby gripping the periphery of the filter disk progressively harder, and causes the O-ring 36 to deform, thereby making a perfect seal at the confronting lands 32 and 56. The housing is disassembled in a manner the reverse of that described above for assembling the housing.

The housing is readily taken to pieces for cleaning. The filter support disk 48 and the O-rings 36 and 43 are taken out of the first housing part.

Instead of the screw-threaded member 102, reaction member 98 and nut 104 for decreasing the effective diameter of the hoop 74, there may be provided another device, such as, a well-known over-center toggle device.

The smaller diameter O-ring 43 within the housing 22, allows the one housing to accommodate a variety of thicknesses of filter material while still providing a seal effective for preventing unfiltered material by-passing the filter and getting into the outlet chamber 30. For example, one embodiment of the present invention which has been constructed, readily and effectively accommodates filter disks ranging in compressed thickness from 0.001" to 0.060". It has been found that an arrangement as described compresses the filter medium in a manner that does not shear or cut the medium at the contact ring.

The material from which the housing parts 26 and 28 are formed should be such as to have no undesirable reaction to materials introduced into the housing to be filtered. It may be, for example, stainless steel or plastics. The housing should be strong enough to resist positive and/or negative pressure differentials to be encountered in normal use without deformation such as would adversely affect seals.

The materials forming the resilient sealing means, in the present embodiment the O-rings 36 and 43, besides being resilient, should also be such that they are not adversely affected by materials being filtered and do not adversely affect the material being filtered.

It will be observed that the chamber 30 has small volume. It extends over the entire effective area of the filter disk but is small in the dimensions parallel to the axis 24. Such small volume reduces waste and clean up problems if material being filtered remains in the housing at the end of a filtering run.

In the embodiment specifically described above, the first housing part has a radially inwardly facing cylindrical surface and the second housing part has a radially outwardly facing cylindrical surface. The two cylindrical surfaces mate and serve to locate the two housing parts relative to one another in directions parallel to the plane of the filter disk. It is to be understood that in other embodiments there may be means for locating the two housing parts relative to one another other than the two cylindrical surfaces. For example, there could be pins on one part received in bores in the other part. However, in such embodiments there would still be the radially inwardly facing cylindrical surface for locating the filter disk. However, in embodiments wherein the radially inwardly facing cylindrical surface is not required to mate with a radially outwardly facing cylindrical surface, the radially inwardly facing surface need not be strictly cylindrical. The surface could be an imaginary one generated by, for example, bosses disposed on a circle. Also, the surface, real or imaginary, could be frusto-conical rather than of uniform cross section as is inherent in the term cylindrical. The term 'cylindrical surface', when used herein in relation to the first housing part, is to be construed as including such other embodiments which are not within strict meanings of the words.

It is to be understood that the inlet and outlet nipples could be located in positions other than on the axis of the housing.

Also the nipples do not have to be perpendicular to the plane of the filter disk; they could be parallel to the plane and at any inclination. They may have any diameter and shape.

The invention has been described in detail with particular reference to a presently preferred embodiment, but it will be understood that variations and modifications can be effected within the spirit and scope of the invention.

What is claimed is:

1. A housing for a disk of filter material, said housing including:

a first disk shaped housing part having an axis and a cylindrical surface facing radially inwardly toward said axis;

a second disk shaped housing part;

said radially inwardly facing cylindrical surface serving to locate the periphery of a disk of filter material radially inwardly of said cylindrical surface when said housing parts are in the disassembled condition and a filter disk is being installed;

first annular resilient sealing means disposed radially inwardly of said cylindrical surface and adapted to seat on one of said housing parts and to be compressed between the periphery of the filter disk and the other of said housing parts, thereby minimizing leakage past the filter disk;

second annular resilient sealing means disposed radially outwardly of said cylindrical surface and adapted to be compressed and create a seal between said housing parts, thereby preventing leakage between the interior and the exterior of the housing; and means for securing said first and second housing parts in assembled condition.

2. A housing as claimed in claim 1, wherein:

said second disk shaped housing part includes a radially outwardly facing cylindrical surface adapted to mate telescopically with said radially inwardly facing cylindrical surface as said two housing parts are brought together during assembly and to locate said two housing parts relative to one another in directions parallel to the general plane of the filter disk.

3. A housing as claimed in claim 1, wherein:

said first housing part includes an annular recess facing said second housing part and located radially outwardly of said cylindrical surface, said second annular resilient means being disposed in said recess.

4. A housing as claimed in claim 3, wherein:

said first housing part includes an annular land disposed in a plane parallel to the general plane of a filter disk in the housing and radially outwardly of said cylindrical surface, and said annular recess is disposed in said land.

5. A housing as claimed in claim 4, wherein:

said second housing part includes an annular land disposed in a plane parallel to the general plane of a filter disk in the housing and in confronting relationship with said annular recess on said first housing part.

6. A housing as claimed in claim 1, wherein:

said first housing part includes a recess facing the second housing part and located radially inwardly from said cylindrical surface, said first annular resilient means being disposed in said recess.

7. A housing as claimed in claim 1, including means for supporting the filter disk against pressure of material to be filtered, said supporting means including a perforated disk of stiff material.

8. A housing as claimed in claim 7, wherein:

said first housing part has a shoulder and a radially inwardly facing surface forming a support and locator for said perforated disk.

9. A housing for a disk of filter material, said housing including:

a first disk shaped housing part having an axis and a cylindrical surface facing radially inwardly toward said axis;

a second disk shaped housing part having a radially outwardly facing cylindrical surface;

said radially inwardly and radially outwardly facing surfaces being in mating relationship in the assembled together condition of said housing parts and serving to guide said housing parts into their desired relationship during assembly;

said radially inwardly facing cylindrical surface serving to locate the periphery of a disk of filter material radially inwardly of said radially inwardly facing cylindrical surface when said housing parts are in the disassembled condition and a filter disk is being installed;

first annular resilient sealing means disposed radially inwardly of said mating cylindrical surfaces and adapted to seat on one of said housing parts and to be compressed between the periphery of the filter disk and the other of said housing parts, thereby minimizing leakage past the filter disk;

second annular resilient sealing means disposed radially outwardly of said mating cylindrical surfaces and adapted to be compressed and create a seal between said housing parts, thereby preventing leakage from the interior of the housing to the exterior; and means for securing said first and second housing parts in assembled condition.

10. A filter for fluent material, including:

a disk of filter material, said disk having a periphery;

a first disk shaped housing part having an axis and a cylindrical surface facing radially inwardly toward said axis;

a second disk shaped housing part;

said radially inwardly facing cylindrical surface serving to locate said periphery radially inwardly of said cylindrical surface when said housing parts are in the disassembled condition and said filter disk is being installed;

first annular resilient means disposed radially inwardly of said cylindrical surface, seated on one of said housing parts and compressed between said periphery and the other of said housing parts, thereby minimizing leakage past said filter disk;

second annular resilient sealing means disposed radially outwardly of said cylindrical surface and compressed to create a seal between said housing parts, thereby preventing leakage between the interior and the exterior of the filter; and means for securing said first and second housing parts in assembled condition.

11. A filter as claimed in claim 10, wherein:

said second disk shaped housing part includes a radially outwardly facing cylindrical surface adapted to mate telescopically with said radially inwardly facing cylindrical surface as said two housing parts are brought together during assembly and to locate said two housing parts relative to one another in directions parallel to the general plane of said filter disk.

12. A filter as claimed in claim 10, wherein:

said first housing part includes an annular recess facing said second housing and located radially outwardly of said cylindrical surface, said second annular resilient means being disposed in said recess.

13. A filter as claimed in claim 12, wherein:

said first housing part includes an annular land disposed in a plane parallel to the general plane of said filter disk in the filter and radially outwardly of said cylindrical surface, and said annular recess is disposed in said land.

14. A filter as claimed in claim 13, wherein:
said second housing part includes an annular land disposed in a plane parallel to the general plane of said filter disk in the filter and in confronting relationship with said annular recess on said first housing part.

15. A filter as claimed in claim 10, wherein:
said first housing part includes a recess facing the second housing part and located radially inwardly from said cylindrical surface, said first annular resilient means being disposed in said recess.

16. A filter as claimed in claim 10, including
means for supporting the filter disk against pressure of material to be filtered, said supporting means including a perforated disk of stiff material.

17. A filter as claimed in claim 16, wherein:
said first housing part has a shoulder and a radially inwardly facing surface forming a support and locator for said perforated disk.

18. A filter for fluent material, including:
a disk of filter material, said disk having a periphery;
a first disk shaped housing part having an axis and a cylindrical surface facing radially inwardly toward said axis;
a second disk shaped housing part having a radially outwardly facing cylindrical surface;
said radially inwardly and radially outwardly facing surfaces being in mating relationship in the assembled together condition of said housing parts and serving to guide said housing parts into their desired relationship during assembly;
said radially inwardly facing cylindrical surface serving to locate said periphery radially inwardly of said radially inwardly facing cylindrical surface when said housing parts are in the disassembled condition and said filter disk is being installed;
first annular resilient sealing means disposed radially inwardly of said mating cylindrical surfaces, seated on one of said housing parts and compressed between the periphery of said filter disk and the other of said housing parts, thereby minimizing leakage past said filter disk;
second annular resilient sealing means disposed radially outwardly of said mating cylindrical surfaces and compressed to create a seal between said housing parts, thereby preventing leakage from the interior of the housing to the exterior; and
means for securing said first and second housing parts in assembled condition.

19. A housing for a disk of filter material, said housing including:
a first disk shaped housing part having an axis and a cylindrical surface facing radially inwardly toward said axis;
a second disk shaped housing part having a radially outwardly facing cylindrical surface adapted to mate telescopically with said radially inwardly facing cylindrical surface as said housing parts are brought together during assembly and to locate said two housing parts relative to one another in directions parallel to the general plane of the filter disk;
said radially inwardly facing cylindrical surface serving to locate the periphery of a disk of filter material radially inwardly of said inwardly facing cylindrical surface when said housing parts are in the disassembled condition and a filter disk is being installed;
first annular resilient sealing means disposed radially inwardly of said radially inwardly facing cylindrical surface and adapted to seat on one of said housing parts and to be compressed between the periphery of the filter disk and the other of said housing parts;
second annular resilient sealing means disposed radially outwardly of said inwardly facing cylindrical surface and adapted to be compressed and create a seal between said housing parts, thereby preventing leakage between the interior and the exterior of the housing;
one of said housing parts having a first annular land disposed in a plane parallel to the general plane of a filter disk in the housing and radially outwardly of said inwardly facing cylindrical surface and a first annular recess disposed in said first annular land and adapted to face the other of said housing parts, said second annular resilient means being disposed in said first annular recess;
one of said housing parts having a second annular recess adapted to face the other of said housing parts and located radially inwardly from said radially inwardly facing cylindrical surface, said first annular resilient means being disposed in said second annular recess; and
means for securing said first and second housing parts in assembled condition.

20. A filter for fluent material, including:
a first disk shaped housing part having an axis and a cylindrical surface facing radially inwardly toward said axis;
a second disk shaped housing part having a radially outwardly facing cylindrical surface mated telescopically with said radially inwardly facing cylindrical surface to locate said two housing parts relative to one another in directions parallel to the general plane of the filter disk;
a disk of filter material, said disk having a periphery;
said radially inwardly facing cylindrical surface serving to locate said periphery radially inwardly of said radially inwardly facing cylindrical surface when said housing parts are in the disassembled condition and said filter disk is being installed;
first annular resilient sealing means disposed radially inwardly of said radially inwardly facing cylindrical surface, seated on one of said housing parts and compressed between the periphery of said filter disk and the other of said housing parts;
second annular resilient sealing means disposed radially outwardly of said radially inwardly facing cylindrical surface and compressed to create a seal between said housing parts, thereby preventing leakage between the interior and the exterior of the housing;
one of said housing parts having a first annular land disposed in a plane parallel to the general plane of said filter disk in the housing and radially outwardly of said radially inwardly facing cylindrical surface and a first annular recess disposed in said first annular land and faced toward the other of said housing parts, said second annular resilient means being disposed in said first annular recess;
one of said housing parts having a second annular recess faced toward the other of said housing parts and located radially inwardly from said radially inwardly facing cylindrical surface, said first annular resilient means being disposed in said second annular recess; and
means for securing said first and second housing parts in assembled condition.

* * * * *